United States Patent Office 3,707,369
Patented Dec. 26, 1972

3,707,369
PHOTOCONDUCTIVE ELEMENTS CONTAINING 2-METHYL-3,3-DIMETHYL INDOLE DERIVATIVES
Hisatake Ono, Syu Watari, and Chiaki Osada, Asaka, Japan, assignors to Fuji Photo Film Co., Ltd., Ashigara-Kamigun, Kanagawa, Japan
No Drawing. Filed Aug. 20, 1970, Ser. No. 65,728
Claims priority, application Japan, Aug. 20, 1969, 44/65,829
Int. Cl. G03g 5/00
U.S. Cl. 96—1.5
11 Claims

ABSTRACT OF THE DISCLOSURE

An electrophotographic element comprising a conducting support coated with an insulating binder having dispersed therein a photoconductive indoline compound having the general formula:

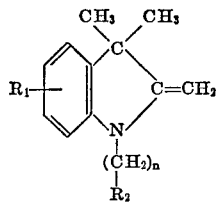

(wherein, $R_1$ is H, an alkyl having 1–4 carbon atoms, a halogen, $-NO_2$, $-OR_3$ or $COOR_3$ ($R_3$ being an alkyl having 1–4 carbon atoms), $R_2$ is H, OH, CN or a phenyl and $n$ is 1–4).

---

This invention relates to organic photoconductive materials for electrophotography. The substances which have heretofore been known to be usable for electrophotography include such inorganic substances as selenium and zinc oxide, various organic low molecular compounds such as anthracene, chrysene and benzidine, and such high molecular compounds of poly-N-vinylcarbazol, polyvinylnaphthalene, and polyvinylanthracene. This invention concerns organic photoconductive materials for electrophotography, comprising 2-methylene indoline compound represented by the general formula:

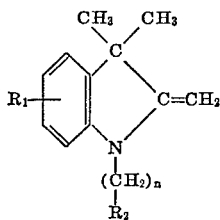

(wherein $R_1$ is H, an alkyl having 1–4 carbon atoms, a halogen, $-NO_2$, $-OR_3$ or $COOR_3$ ($R_3$ being an alkyl having 1–4 carbon atoms), $R_2$ is H, OH, CN or a phenyl, and $n$ is 1–4).

The compounds represented by the aforementioned generic formula have new structures entirely different from those of conventionally known organic photoconductive materials for electrophotography. The said compounds are generally synthesized as disclosed in Liebig Ann. Chem. Vd, 242, p. 351 (1887) and are well known as intermediates for pigments. Through researches, the inventors have discovered that these compounds have properties suitable as organic photoconductive materials for electrophotography. For example, 1,3,3-trimethyl-2-methyleneindoline which satisfies the aforementioned generic formula with $R_1=R_2=H$ and $n=1$ is solidified by placing 19 g. of paramethyl toluenesulfonate in a flask and heating the flask in an oil bath at 120° C. for 3 hours. The solid substance thus obtained is dissolved in 200 ml. of water, with insoluble matter extracted out with ether. Upon addition of 50 ml. of 20% aqueous solution of caustic soda to the portion dissolved with water, an oily substance is isolated. This isolated substance is extracted with 150 ml. of ether, the extracted portion is washed sufficiently with water and then separated, and the ether portion is deprived of water with anhydrous Glauber's salt. The ether is removed through concentration and distillation. Thereafter, the oily substance is distilled under reduced pressure. Consequently, there is obtained a colorless liquid which is 1,3,3-trimethyl-2-methyleneindoline having a boiling point 116.5° C./15 mm. Hg.

1,3,3-trimethyl-5-chloro-methyleneindoline which satisfied the generic Formula I with $R_1=Cl$, $R_2=H$ and $n=1$ is obtained at a boiling point of 129° C./6 mm. Hg from 2,3,3-trimethyl-5-chloroindolenin and paramethyl toluenesulfonate. 1,3,3-trimethyl-5-methoxy-2-methyleneindoline which satisfies the generic Formula I with $R_1=H$, $R_2=CN$ and $n=3$ is obtained at a boiling point 132° C./6 mm. Hg from 2,3,3-trimethyl-5-methoxyindolenin and paramethyl toluene sulfonate. 1,3,3-trimethyl-5-carboethoxy-2-methyleneindoline which satisfies the generic Formula I with $R_1=COOC_2H_5$, $R_2=H$ and $n=1$ is obtained at a boiling point 140° C./4 mm. Hg from 2,3,3-trimethyl-5-carboethoxyindolenin and paramethyl toluenesulfonate. 1 - cyanopropyl-3,3-dimethyl-2-methyleneindoline which satisfies the generic Formula I with $R_1=H$, $R_2=CN$ and $n=3$ is obtained at a boiling point 150° C./19 mm. Hg from 2,3,3-trimethylindolenin and nitryl gammabromobutyrate. 1-benzyl - 3,3 - dimethyl-2-methyleneindoline which satisfies the generic Formula I with $R_1=H$, $R_2=$phenyl, and $n=1$ is obtained at a boiling point 140° C./5 mm. Hg from 2,3,3-trimethylindolenin and benzyl chloride.

1,3,3 - trimethyl-5-nitro-2-methyleneindoline satisfying the generic formula with $R_1=NO$, $R_2=H$ and $n=1$ is obtained as a crystalline substance when the quaternized product derived through the reaction between 2,3,3-trimethyl-5-nitroindolenin and paramethyl toluenesulfonate is combined with the aqueous solution of caustic soda. When this crystalline product is recrystallized with ligroin, there is obtained the substance having a melting point 98° C. Similarly, 1-hydroxyethyl-3,3,5-trimethyl-2-methyleneindoline is obtained as a substance having a melting point 59° C. from 2,3,3,5-tetramethylindolenin and ethylene bromohydrin. To use a compound thus obtained as the electrophotographic material, the compound is dissolved, together with a highly insulative, resinous film-forming binding agent, in an organic solvent capable of dissolving them and the solution is spread and dried on a base having comparatively high electroconductivity so as to form a film, which will serve as a sensitive layer. It is also possible to enable the film to be improved in behavior and enhanced greatly in sensitivity by incorporating a plasticizer and a sensitizer. As resinous, film-forming binding agents usable for this purpose, there may be cited styrene-butadiene copolymer, polystyrene, chlorinated rubber, polyvinyl chloride, vinyl chloride/vinyl acetate copolymer, polyvinylidene chloride, nitrocellulose, polyvinyl acetate, polyvinyl acetal, polyvinyl ether, silicone resins, methacrylic resin, acrylic resin, phenol resin, alkyd resin, and urea/aldehyde resin. Suitable electroconductive bases are metal plate, paper processed so as to acquire electroconductivity, plastic film, etc. As plasticizers, there may be used chlorinated biphenyl, chlorinated paraffin, phosphate type plasticizers, and phthalate type plasticizers. As sensitizers, it is effective to use tetracyanoethylene, tetracyanoquinodimethane, chloranil, naphthoquinone, anthraquinone, Methylene Blue, Crystal Violet, Malachite Green, and others which are commonly known. The indoline compounds may be incorporated into the dissolved or melted binder-resin by any suitable means such as strong agitation, such as, ball milling, ultrasonic agitation, high speed blending. Any suitable ratio of pigment to resin may be used. On a pigment-dried resin weight basis, the preferred range is from about 1:1 to about 1:10. It is desirable to combine these components suitably and spread the mix on an electroconductive base to a dry thickness of 2–20μ.

The sensitive layer thus obtained can be uniformly charged through corona discharge, exposed to light projected through an image, and subsequently developed such as by cascade developing process or liquid developing process by way of the ordinary procedure of electrophotography. In the case of cascade development, the developed image can be fixed by either being heated mildly or being placed within the vapor of an organic solvent capable of dissolving the resinous component of toner.

The invention is described in further detail by referring to preferred embodiments below. It should be understood that the invention is not limited to such preferred embodiments.

EXAMPLE 1

One half (0.5) g. of 1,3,3-trimethyl-2-methyleneindoline and 20 cc. of 10% benzene solution of polystyrene were mixed homogeneously. The resultant solution was spread to a dry film thickness of 5μ on an aluminum sheet used as the base. After the solvent had dried, the layer was positively charged in a dark place and, with a film containing a positive image placed thereon, exposed to light from a high-voltage mercury bulb (SHL–100 made by Toshiba) placed at a distance of 30 cm. above for about five seconds, and developed with a developing agent containing therein a negatively charged toner (developing agent for Xerox 914, for example). Consequently, there was developed a positive image. When the layer was placed within the atmosphere of trichloroethylene there was obtained a fixed, clear positive image.

EXAMPLE 2

One half (0.5) g. of 1,3,3-trimethyl-5-chloro-2-methyleneindoline and 20 cc. of 10% benzene solution of polystyrene were mixed homogeneously. The resultant solution was spread to a dry film thickness of 5μ on an aluminum sheet. After the solvent had dried, the layer was charged, exposed to light, developed and fixed in the same procedure as in Example 1. Consequently, there was obtained a clear image.

EXAMPLE 3

One half (0.5) g. of 1,3,3-trimethyl-5-methoxy-2-methyleneindoline and 20 cc. of benzene solution of styrene were mixed homogeneously. The resultant solution was spread on an aluminum sheet. The electrophotographic photoconductive material thus obtained was subjected to the steps of electric charging, light exposure, development, and fixation in the same procedure as in Example 1. Consequently, there was obtained a clear image.

EXAMPLE 4

One half (0.5) g. of 1,3,3-trimethyl-5-carboethoxy-2-methyleneindoline and 0.01 g. of chloranil were dissolved in 20 ml. of 10% benzene solution of polystyrene. The resultant solution was spread to a dry film thickness of 8μ on an aluminum sheet. On drying, the layer was charged electrically, exposed to light projected through an image from an incandescent bulb placed at a distance of 30 cm. above for five seconds, developed and fixed. Consequently, there was obtained a clear image.

EXAMPLE 5

A clear image was obtained by following the procedure of Example 1, except 1,3,3-trimethyl-5-nitro-2-methyleneindoline was used in the place of 1,3,3-trimethyl-2-methyleneindoline.

EXAMPLE 6

An image was obtained in the same procedure as Example 1 by using 1-cyanopropyl-3,3-dimethyl-2-methyleneindoline.

EXAMPLE 7

Also 1 - benzyl-3,3-dimethyl-2-methyleneindoline produced an image in the same procedure as in Example 1.

What is claimed is:

1. An electrophotographic element comprising a conducting support coated with an insulating binder having dispersed therein a photoconductive 2-methylene-3,3-dimethylindoline derivatives having the general formula:

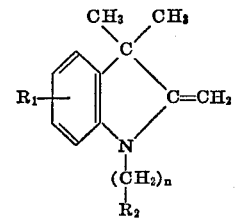

(wherein, $R_1$ is H, and alkyl having 1–4 carbon atoms, a halogen, $-NO_2$, $-OR_3$ or $COOR_3$ ($R_3$ being an alkyl having 1–4 carbon atoms), $R_2$ is H, OH, CN or a phenyl and $n$ is 1–4).

2. The electrophotographic element of claim 1 wherein said 2-methylene-3,3-dimethylindoline derivatives is 1,3,3-trimethyl-2-methyleneindoline.

3. The electrophotographic element of claim 1 wherein said 2-methylene-3,3-dimethylindoline derivatives is 1,3,3-trimethyl-5-chloro-2-methyleneindoline.

4. The electrophotographic element of claim 1 wherein said 2-methylene-3,3-dimethylindoline derivatives is 1,3,3-trimethyl-5-methoxy-2-methyleneindoline.

5. The electrophotographic element of claim 1 wherein said 2-methylene-3,3-dimethylindoline derivatives is 1,3,3-trimethyl-5-carboethoxy-2-methylenindoline.

6. The electrophotographic element of claim 1 wherein said 2-methylene-3,3-dimethylindoline is 1,3,3-trimethyl-5-nitro-2-methylenindoline.

7. The electrophotographic element of claim 1 wherein said 2-methylene-3,3-dimethylindoline derivatives is 1-cyanopropyl-3,3-dimethyl-2-methyleneindoline.

8. The electrophotographic element of claim 1 wherein said indoline compound is 1-benzyl-3,3-dimethyl-2-methyleneindoline.

9. The electrophotographic element of claim 1 wherein said 2-methylene-3,3-dimethylindoline derivatives is 1-hydroxyethyl-3,3,5-trimethyl-2-methyleneindoline.

10. A process of using 2-methylene-3,3-dimethylindoline comprising the steps of uniformly charging an electrophotographic element containing said 2-methylene-3,3-dimethylindoline and image exposing it to a light pattern to form an electrostatic charge pattern thereon.

11. A process as in claim 10 where said 2-methylene-3,3-dimethylindoline is selected from the group consisting of 1,3,3-trimethyl-2-methyleneindoline, 1,3,3-trimethyl-5- chloro-2-methyleneindoline, 1,3,3-trimethyl-5-methoxy-2-methyleneindoline, 1,3,3 - trimethyl - 5 - carboethoxy-2-methyleneindoline, 1,3,3 - trimethyl-5-nitro-2-methyleneindoline, 1-cyanopropyl-3,3-dimethyl - 2 - methyleneindoline, 1-benzyl-3,3-dimethyl - 2 - methyleneindoline, and 1-hydroxyethyl-3,3,5-trimethyl-2-methyleneindoline.

References Cited

UNITED STATES PATENTS

| | | | |
|---|---|---|---|
| 3,554,741 | 1/1971 | Gipstein | 96—1 |
| 3,573,289 | 3/1971 | Straley et al. | 260—240 |
| 3,531,478 | 9/1970 | Irick | 260—240 |
| 3,351,600 | 11/1967 | Brack et al. | 260—288 |
| 3,347,844 | 10/1967 | Rhyner et al. | 260—165 |
| 3,148,982 | 9/1964 | Ghys et al. | 96—1 |

GEORGE F. LESMES, Primary Examiner

M. B. WITTENBERG, Assistant Examiner

U.S. Cl. X.R.

96—1 R; 260—326.11